Oct. 16, 1956 P. M. G. TOULON 2,767,312

SIGNAL DISTRIBUTION SYSTEM

Filed Dec. 26, 1950

INVENTOR
PIERRE MARIE GABRIEL TOULON

BY William R. Liberman

ATTORNEY

United States Patent Office 2,767,312

Patented Oct. 16, 1956

2,767,312

SIGNAL DISTRIBUTION SYSTEM

Pierre M. G. Toulon, New York, N. Y., assignor, by mesne assignments, to Moore and Hall, Washington, D. C., a partnership Application December 26, 1950, Serial No. 202,605

10 Claims. (Cl. 250—27)

Figures 1, 2:
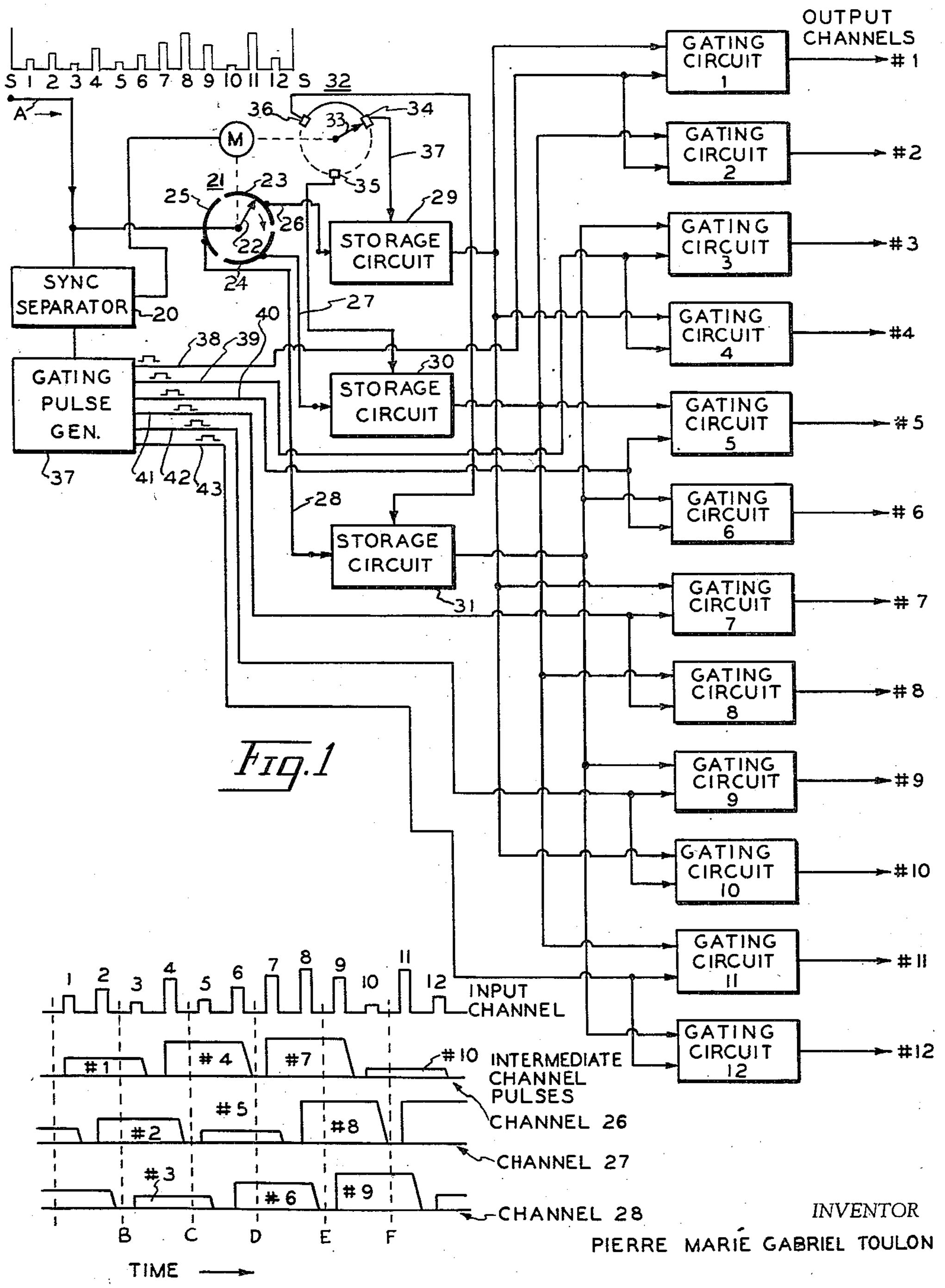

The present invention relates generally to systems of signal distribution, and more particularly to improved systems for distributing successive pulses arriving over a single input channel, among a plurality of independent output channels.

It is well known, in systems for distributing successive pulses arriving over a single input channel among a plurality of independent output channels, to effect the distribution in a plurality of steps, or by means of a plurality of cascaded distributors. In such case the pulses arriving over the input channel are distributed among a small number of intermediate channels, by means of a first distributor. The pulses in each of the intermediate channels are then distributed among a relatively large number of independent output channels by a further distributor.

The difficulty with systems of the character described, as well as with the more direct systems in which only a single step of distribution is employed, when an extremely large number of output channels must be supplied with pulses, resides in the complexity of the system required for synchronizing and controlling the distribution of pulses. The latter function may be accomplished, in practice, by means of gating pulses, which occur in each of the output channels at the instant when a pulse is to be passed therethrough. The required gating pulse generator is then extremely complex and expensive.

It is an object of the present invention to provide an improved system for pulse distribution from a single input channel among a large number of independent output channels, wherein a reduced number of gating pulses may be employed, by enabling utilization of each gating pulse to gate simultaneously a plurality of output channels.

In accordance with a preferred embodiment of the invention the pulses which are to be distributed among a large number of output channels are first distributed among a relatively small number of intermediate channels, and the pulses in each of the intermediate channels are each lengthened or extended in time, until just before a further pulse is expected in the intermediate channel under consideration. It follows that there will be pulses overlapping in time in the separate intermediate channels, which did not overlap in time in the input channel. Those pulses which overlap in time in separate intermediate channels may then be gated from the separate intermediate channels to different output channels by means of a single gating pulse, thus reducing the total number of gating pulses required by a factor of at least two.

A preferred embodiment of the present invention is illustrated in the accompanying drawings, wherein:

Figure 1 provides a block diagram of a system in accordance with the invention; and, Figure 2 is a timing diagram employed in explaining the invention.

Referring specifically to the drawings, the reference numeral A denotes an input channel for pulses numbered 1 to 12 in sequence, the pulses to be distributed among twelve output channels, and each sequence of twelve pulses being preceded by a synchronizing pulse S. It will be realized that the principles of the invention may be extended to an extremely large number of output channels, as is required in some types of television systems, i. e., of the order of 100,000.

The pulses arriving over the line A are applied to a sync separator 20, which separates out the sync pulses S, and applies these to a motor device M, which rotates in synchronism with the groups of pulses, completing 4 rotations for each group.

The motor M drives a mechanical distributor switch, generally denominated by the reference numeral 21, and having a rotating contactor arm 22 and three stationary contacts 23, 24, 25, which are mutually insulated, and each of which extends substantially over one-third the path of travel of the rotating distributor arm 22. It follows that the distributor arm 22 applies the pulses in sequence to the stationary contacts, the first pulse to the segment 23, the second pulse to the segment 24, the third pulse to the segment 25, the fourth pulse again to the segment 23, etc. Every first, fourth, seventh and tenth pulse is applied then to the segment 23, every second, fifth, eighth and eleventh pulse to the segment 24, and every third, sixth, ninth and twelfth pulse to the segment 25. Obviously, the mechanical distributor described hereinabove and illustrated in the accompanying drawings, may be replaced by an electronic distributor having no moving parts.

Output lines are connected to the distributor contacts 23, 24 and 25, which may be respectively identified by the reference numerals 26, 27 and 28, and which constitute the intermediate channels hereinabove referred to. These channels transmit the pulses impressed thereon to storage circuits, identified respectively by the reference numerals 29, 30 and 31. The storage circuits 29, 30 and 31 are of the nature of pulse lengtheners, which extend the duration of any pulse supplied thereto, until just before a further pulse is to be applied to the storage circuit from an intermediate channel. A further distributor switch 32 is provided, which is driven from the motor M, and which comprises a rotating switch arm 33 and three contacts 34, 35 and 36. When the rotating switch arm 33 is in contact with the stationary switch arm 34, a discharge signal is applied over the line 37 to the storage circuit 29, causing the same to discharge any signal which may be present thereon in preparation for a further signal applied thereto via the intermediate channel 26. The contacts 35 and 36 operate in like manner with respect to the storage circuits 30 and 31, respectively.

It follows that pulse 1, when applied to storage circuit 29, remains therein, or is lengthened, until just before pulse 4 arrives at storage circuit 29. Just before pulse 4 arrives at storage circuit 29 the contact 34 is contacted by switch arm 33, the storage circuit 29 is discharged, and is ready then for pulse 4 to arrive. When pulse 4 arrives it is stored or lengthened, remaining in storage until just before pulse 7 is due to arrive at storage circuit 29, when switch arm 33 contacts stationary contact 35, discharging storage circuit 29 in preparation for the arrival of pulse 7. The sequence of events in the various storage circuits 29, 30 and 31 is similar, so that there is provided at the output of the storage circuits, one-third the number of pulses which are available at the input channel A, the pulses being lengthened, however, so that they are almost, but not quite contiguous.

Referring now more particularly to Figure 2 of the accompanying drawings, there is shown at line 1 the twelve pulses arriving in the input channel A and numbered 1 to 12 successively. At line 2 is illustrated the stored or lengthened pulses available in the intermediate channel 26, corresponding in amplitude to the pulses 1, 4, 7 and 10, respectively. At line 3 is illustrating the pulses appearing in intermediate channel 27, these pulses corresponding with original pulses present in the input channel, and numbered 2, 5 and 8. Similarly, at line 4 of Figure 2 is illustrated pulses as present in the intermediate channel 28, and corresponding with input channel pulses 3, 6 and 9.

It will be perceived that pulse 1, as it appears in intermediate channel 26, and pulse 2 as it appears in intermediate channel 27, overlap at a point intermediate pulses 2 and 3 in the input channel, and that at this moment no signal is present in intermediate channel 28. It follows that if the intermediate channels 26 and 27 were sampled at the time B, intermediate the times of occurrence of pulses 2 and 3, that this sampling could be accomplished by means of a single sampling pulse, which could be applied simultaneously to transfer signal from intermediate channel 26 to an output channel and from intermediate channel 27 to a different output channel. Similarly, at time C, channels 26 and 28 could be sampled; at time D, channels 27 and 28 could be sampled; at times E, channels 26 and 27 could be sampled; and at times FF channels 26 and 28 could be sampled. A further sampling time could be set just after pulse 12 or just before pulse 1, this time being denominated G in Figure 2.

It follows that 12 output channels could be supplied with output signals in response to only 6 control signals or sampling pulses, each of the control signals or sampling pulses being timed to divert signals from two intermediate channels to two different output channels.

Returning now to Figure 1 of the accompanying drawings, the output of storage circuit 29 is applied in parallel to gating circuits 1, 4, 7 and 10. The output of storage circuit 30 is applied in parallel to gating circuits 2, 5, 8 and 11. The output of storage circuit 31 is applied in parallel to gating circuits 3, 6, 9 and 12. These gating circuits lead to output channels correspondingly numbered.

The gating circuits 1 to 12, inclusive, are normally off, and may be turned on in response to gating pulses. The latter may be generated by means of a gating pulse generator 37, which is synchronized from the output of the sync separator 20, and which supplies, in accordance with the present embodiment of the invention, six separate gating pulse lines denominated 38, 39, 40, 41, 42 and 43.

The gating pulses provided by line 38 are applied to gate "on" gating circuits #1 and #2; those supplied by line 39 are applied to gate "on" gating circuits #3 and #4; those supplied to line 40 are applied to gate "on" gating circuits #5 and #6, etc.

It follows that the output channels #1 to #12 inclusive, are supplied with signal in response to six separately timed gating pulses instead of twelve, as has been the case in the prior art, these gating pulses occurring in timed succession, as at times B, C, D, E, F, G, each in a separate one of the lines 38 . . . 43, inclusive.

The principle of the invention may clearly be extended to a system in which, say, ten intermediate channels are employed, each of which feeds ten gating circuits, thereby distributing successively occurring pulses among one hundred independent output channels, and in such case, the duration of each pulse in each intermediate channel would be extended to between ten and eleven times the duration of each pulse in the input channel, and one gating pulse would then be adequate to effect transfer of ten signals simultaneously to ten of the output channels. Thereby is obtained a reduction in the total number of gating pulses required by a factor of ten.

The principle may be further extended to multiply cascaded systems, in which the signals in each intermediate channel are divided among a plurality of further intermediate channels, and the signals derived from each of the latter again distributed among a plurality of final or output channels.

While I have described and illustrated specific forms of the invention it will be clear that variations thereof may be resorted to without departing from the true scope of the invention as defined in the appended claims.

What I claim and desire to secure by Letters Patent of the United States is:

1. In a system for distributing input pulses, which occur successively in a single input channel, among a plurality of output circuits, means for extending said pulses in duration sufficiently to provide time overlapping pulses, means periodically sampling the time overlapping portions of said extended pulses, and gate means responsive to said sampling means for distributing said time overlapping pulses simultaneously among said output circuits, said sampling means being operative during restricted time intervals intermediate the occurrence of preselected adjacent pulses of the said successive input pulses.

2. In a system for distributing input pulses, which occur successively in a single input circuit, among a plurality of output circuits, means for extending the pulse width of said pulses in duration sufficiently to provide time overlapping pulses, and gating means for sampling the time overlapping portions of said time overlapping pulses simultaneously at restricted time intervals intermediate the occurrence of preselected adjacent pulses of said successive input pulses.

3. In a system for distributing periodic pulses, which occur successively in a single input channel, among a plurality of output circuits, means for distributing said pulses on a time sharing basis among a plurality of intermediate channels with the pulses in each intermediate channel occurring periodically, means for extending the durations of the pulses in each intermediate channel to provide time overlap of pulses among a plurality of said intermediate channels at any one time, and means operative at restricted time intervals intermediate the occurrence of preselected successive ones of said periodic pulses for distributing time overlapping portions of time overlapping pulses in said plurality of said intermediate channels simultaneously to selected ones of said output circuits.

4. In a system for distributing successive input pulses from a single input channel to a plurality of independent output channels, means for lengthening each of said pulses to provide lengthened pulses, at least a plurality of said lengthened pulses having portions thereof which occur simultaneously at time intervals intermediate said successive input pulses, and means operative at restricted time intervals intermediate the occurrence of preselected successive input pulses for simultaneously distributing among selected ones of said independent output channels signals corresponding with said portions of said lengthened pulses which occur simultaneously.

5. In a system for distributing pulses, a source of successive input pulses occurring in non-overlapping relation, means for lengthening said successive input pulses so that they overlap, a plurality of output channels, gating means for gating separate ones of the lengthened pulses into different ones of said output channels, said gating means being responsive to control pulses occurring intermediate to and in non-overlapping relation with preselected ones of said successive input pulses for gating portions of said lengthened pulses, and means for applying a single control pulse simultaneously to said gating means during overlap time of said lengthened pulses intermediate the times of occurrence of said successive input pulses.

6. In a system for distributing successive input signals from an input channel to a relatively large number of output channels, a relatively small number of intermediate channels, a first distributor for distributing said signals from said input channel on a time sharing basis to said relatively small number of intermediate channels, a plurality of further distributors each for distributing signals from one of said intermediate channels to a plurality of output channels of said relatively large number of output channels, means for lengthening the signals in each of said intermediate channels sufficiently that at least two lengthened signals occupying different ones of said intermediate channels overlap in time, a gating circuit in each of said output channels normally preventing transfer of signals and responsive to a control pulse for enabling transfer of signals, means for producing said control pulses at restricted time intervals occurring intermediate preselected ones of said successive input signals, and means for applying each of said control pulses to said different ones of said intermediate channels.

7. In a system for distributing successive input pulses from an input channel to a large number of output channels, means for distributing pulses from said input channel into a plurality of intermediate channels on a time sharing basis, means for lengthening the pulses in each of said intermediate channels sufficiently to provide time overlapping of pulses in separate ones of said intermediate channels, means responsive to control pulses for transferring signals from said intermediate channels to said output channels on a time sharing basis, and means for applying simultaneous control pulses selectively to said last means to simultaneously transfer time overlapping pulses to said output channels at restricted time intervals intermediate the occurrence of preselected adjacent pulses of the said successive input pulses.

8. The system of claim 2 in which said means for extending said pulses comprises a plurality of storage circuits, and a plurality of gating circuits coupled to the output of each of said storage circuits, said means for sampling comprising a generator of control pulses coupled to said gating circuits.

9. The system of claim 8 in which said generator of control pulses has a plurality of time distributed pulse outputs, each of said pulse outputs being fed to different predetermined groups of said gating circuits.

10. The system of claim 9 in which the pulses to be distributed are fed to an input of said system in a serial train of pulses, and a distributor coupled to said input and cyclically feeding individual pulses of said serial train of pulses to different ones of said storage circuits.

References Cited in the file of this patent

UNITED STATES PATENTS

| | | |
|---|---|---|
| 2,462,111 | Levy | Feb. 22, 1949 |
| 2,516,888 | Levy | Aug. 1, 1950 |
| 2,530,957 | Gilman | Nov. 21, 1950 |
| 2,554,112 | Libois | May 22, 1951 |
| 2,678,997 | Darlington | May 18, 1954 |